(12) United States Patent
Fetzer

(10) Patent No.: US 6,435,800 B2
(45) Date of Patent: Aug. 20, 2002

(54) SLAG TRANSPORTER

(75) Inventor: Jochen Fetzer, Bibertal-Bühl (DE)

(73) Assignee: KAMAG Transporttechnik GmbH & Co., Ulm (DE)

( * ) Notice: Subject to any disclaimer, the term of this patent is extended or adjusted under 35 U.S.C. 154(b) by 0 days.

(21) Appl. No.: 09/783,413

(22) Filed: Feb. 14, 2001

(30) Foreign Application Priority Data

Feb. 24, 2000 (DE) .......................................... 100 08 637

(51) Int. Cl.⁷ ................................................. B60P 1/16
(52) U.S. Cl. ........................................................ 414/420
(58) Field of Search .................. 414/460, 420

(56) References Cited

U.S. PATENT DOCUMENTS 4,105,130 A * 8/1978 Hardwick .................. 414/421
4,122,961 A * 10/1978 Kress ........................ 414/420
4,378,188 A * 3/1983 Hardwick .................. 414/411

FOREIGN PATENT DOCUMENTS

RU 1350061 * 11/1987 .................. 414/420

* cited by examiner

*Primary Examiner*—Steven A. Bratlie
(74) *Attorney, Agent, or Firm*—Darby & Darby

(57) ABSTRACT

A slag transporter (10) includes a drive unit (12), a U-frame type vehicle frame (14) connected to the drive unit, two rear wheels (18) secured to the vehicle frame (14) and a tilting mechanism hinged to the vehicle frame (14) for tilting a slag bucket (30). The tilting mechanism for the slag bucket (30) includes a first tilt frame (20) hinged to the vehicle frame (14) and which is swivable relative to the vehicle frame (14) by a first swiveling mechanism. A second tilt frame (22) is pivot-mounted on the first tilt frame (20) and which is swivable relative to the first tilt frame (20) by a second swiveling mechanism, a mount (28) being provided on the second tilt frame (22) for the bucket trunnions (32) of the slag bucket(30).

17 Claims, 3 Drawing Sheets

SLAG TRANSPORTER

BACKGROUND OF THE INVENTION

1. Field of the Invention

The invention relates to a slag transporter, suitable in general for transporting metallurgical transport containers, for picking up and placing slag buckets, for transporting them as well as for emptying the slag from the containers.

In steel-making, large amounts of slag need to be transported and subsequently dumped. For this purpose the slag is filled into a transport container, also termed slag container or slag bucket, generally capable of accommodating roughly 15 to 16 tons of slag. Conventionally the transport distances for the slag container are in the region of roughly 800 m needing to be covered in the steelworks. The slag container is subsequently tilted so that the steel waste can be flow-tipped from the container. In this arrangement it needs to be taken into account that the slag is molten and extremely hot which in conjunction with the very often cramped space availability in the steelworks makes it all the more difficult in handling slag containers.

2. Description of Prior Art

A distinction is made in this field between two basic types. The so-called "U-frame type" has the advantage of speedy and facilitated pick-up of the slag buckets and low-level transport thereof, resulting in a low center of gravity of the vehicle and the transporter being highly stable in operation, despite the relatively low deadweight of this type.

As an alternative, so-called "platform-type" slag transporters are put to use when narrower vehicle widths are desired or a high dump capacity is wanted. As compared to the U-frame type vehicle, platform-type vehicles have furthermore the advantage that the tilt angle for the slag bucket is greater in general whereas conventional U-frame type vehicles are restricted to a tilt angle of roughly 130° at the most. Because of the restricted tilt angles this often results in the slag not being totally emptied from the bucket where it binds on chilling.

To minimize the disadvantages of the U-frame type vehicles in emptying the slag, i.e. to ensure satisfactory emptying even when restrict ed to a tilt angle of 130° beaters are often incorporated in U-frame type slag transporters. These beaters are able to release caked slag from the slag bucket by mechanical agitation such as shaking or jolting.

Described, for example, in DE 44 03 350 A1, is a U-frame type slag transporter characterized by a valve assembly via which the annular surface area of the tilt cylinder is connected to the piston surface area whilst permitting a flow of compressed hydraulic fluid into the piston surface area from the axle cylinders. The valve assembly as described in DE 44 03 350 A1 serves directly in providing a beater means with which releasing hard-caked slag remainders from the slag bucket is made possible hydraulically, i.e. despite the restricted tilt angle the slag remainders can be released by the additional beater means.

However, these additional beater means, a part from the additional design complication they involve which adds to the risk of a malfunction, have further drawbacks. The beating exposes the slag bucket to heavy mechanical loading, resulting in the mounting structure of the slag bucket being highly stressed. This in turn results in relatively fast component fatigue.

SUMMARY OF THE INVENTION

The invention is based on the object of proposing a U-frame type slag transporter permitting swivelling of the slag bucket by as much as 180°.

This object is achieved by a slag transporter including a drive unit, a U-frame type vehicle connected to the drive unit, two rear wheels secured to the rear frame and a tilting means hinged to the vehicle frame for tilting a slag bucket. The tilting means for the slag bucket includes a first tilt frame hinged to the vehicle frame and which is swivable relative to the vehicle frame by a first swivelling means. The tilting means further includes a second tilt frame hinged to the first tilt frame and which is swivable relative to the first tilt frame by a second swivelling means. A mount also forms a part of the tilting means and is provided on the second tilt frame for the bucket trunnions of the slag bucket.

The gist of the invention is to modify the tilting arm of a conventional U-frame type slag transporter such that the tilt angle range from 130° to 180° is covered by an additional booster. For this purpose a second tilt frame is applied to the tilt frame as existing on conventional type slag transporters, the second tilt frame being swivable relative to the first tilt frame. The mounts for the bucket trunnions of the slag bucket are provided on this second additional tilting arm so that now there is no need to place and regrip the slag bucket when the bucket is swivelled from its transport position into a position by as much as 180° relative to the transport position.

It is thus now possible on a U-frame type vehicle too, having no beater means, to pivot a slag bucket through 180°, i.e. upside-down to thus facilitate releasing the slag from the bucket, especially in releasing it uniformly from the complete bucket.

Thus, in accordance with one preferred embodiment for swivelling the two tilt frames a hydraulic means is provided for each. In usual design of U-frame type slag transporters, swivelling the tilt frame relative to the vehicle frame is likewise assured by hydraulic cylinders. Hydraulic cylinders are relatively simple to control and are rugged. A first hydraulic cylinder for swivelling the first tilt frame is secured for this purpose by its first end to the vehicle frame and by its second end to a middle portion, preferably the main tilt frame. The second hydraulic cylinder serving to swivel the second tilt frame, also termed additional frame, relative to the main tilt frame (first tilt frame) is connected by the its first end in a portion remote from the pivot axis of the first tilt frame and by its second end in a middle portion of the second tilt frame. By actuating the second hydraulic cylinder a pivoting movement of the second tilt frame is achieved relative to the first tilt frame.

The mounts for the bucket trunnions applied to the second tilt frame are provided in a second preferred embodiment with a locking means. The locking means serves to ensure that when the slag bucket is swivelled through 180° it is reliably held in the mount in preventing it from sliding out of the mount. When transporting the slag bucket in the transport position too, the locking means additionally safeguards the slag bucket in preventing it from slipping out of place or tilting unwantedly.

Preferably the first tilt frame is U-shaped and comprises overall dimensions so that the first tilt frame can be substantially accommodated within the vehicle frame and/or therebove when the first tilt frame is located relative to the vehicle frame in the transport position. This achieves a low center of gravity of the loaded slag transporter, resulting in the vehicle being stable in operation and thus excelling as regards the safety requirements on the transport vehicle in handling hot slag. The first tilt frame pivoted to each rear open end of the vehicle frame is thus located on the vehicle frame so that the open side of the U-shaped first tilt frame is at the rear in the transporting direction, i.e. that the U formed by the vehicle frame and the U formed by the first tilt frame are each oriented the same.

Advantageously, the second tilt frame is likewise substantially U-shaped. The second tilt frame pivoted to the first tilt frame is likewise oriented so that the open end of the U is located at the rear in the transporting direction when transporting, i.e. that the Us formed by the vehicle frame, the first tilt frame and the second tilt frame are all oriented the same. The second tilt frame is dimensioned to advantage so that it is substantially located on the first tilt frame. At the same time or instead of this arrangement it may also be dimensioned so that it can be accommodated within the first tilt frame to thus avoid any widening of the vehicle.

Preferably the fulcrum of the second tilt frame relative to the first tilt frame is located in the vicinity of the mount for the first swivelling means for the first tilt frame. The second swivelling means is provided in one preferred embodiment at the end remote from the fulcrum of the first tilt frame and applied by its other end to a middle portion of the legs of the U of the second tilt frame. It is this arrangement that ensures that also in the boosted swivelled condition, i.e. when swivelling exceeds approx. 130° of the first tilt frame relative to the vehicle frame and swivelling of the second tilt frame of max 50° relative to the first tilt frame adequate stability of the vehicle and swivelling means is provided.

Applied to advantage to the vehicle frame are two rockers which in conjunction with each axle cylinder enable the vehicle frame to be lifted and lowered. Lifting and lowering the vehicle frame is of advantage, for one thing, for picking-up the slag bucket from elevated locations or for placement thereon, and, for another, for simplifying dumping depending on the circumstances in the steelworks due to the higher location above ground in the dumping, whereas in transport, the center of gravity remains low to advantage.

In this arrangement the rear wheels of the slag transporter may be configured as single wheels, each applied to a separate rocker. As an alternative to this arrangement it is also possible to configure the rear wheels in a swing or tandem axle arrangement, meaning that two wheels each on one side of the vehicle are connected in series or in parallel, as viewed in the transporting direction by means of a suitable axle connection.

BRIEF DESCRIPTION OF THE DRAWINGS

The invention will now be detailed purely by way of example with reference to the attached drawings in which.

DETAILED DESCRIPTION

Figure 1:
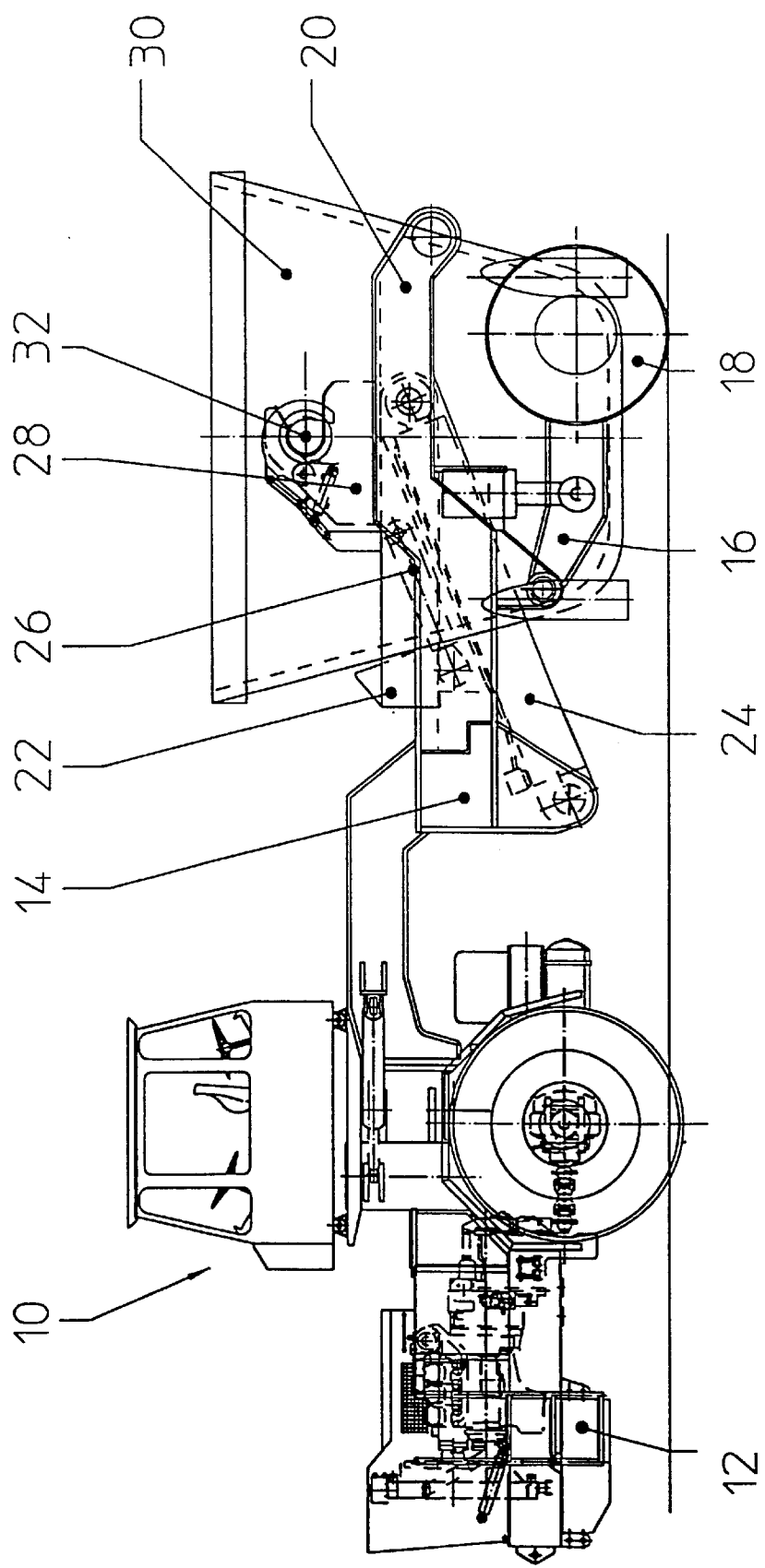
FIG. 1 is a side view of the slag transporter in accordance with the invention showing a slag bucket accommodated in the transport position on the vehicle.
Figure 2:
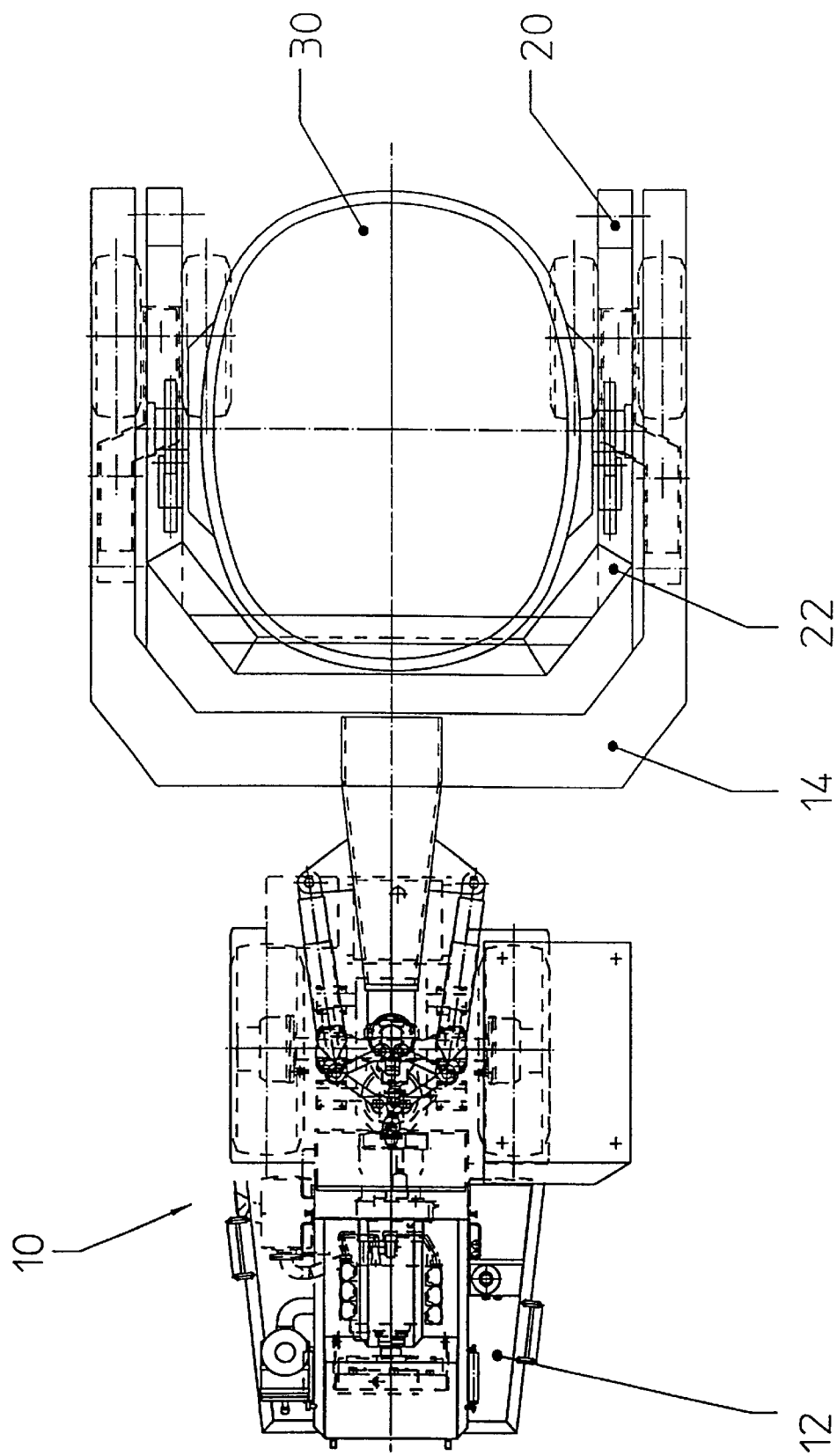
FIG. 2 is a view from above of the slag transporter in accordance with the invention as show in FIG. 1 in which the slag bucket is likewise located in the transport position of the vehicle.

Referring now to FIGS. 1 and 2 there is illustrated the slag transporter 10 comprising a drive unit 12 on which a vehicle frame 14 is mounted. The vehicle frame 14 is configured U-shaped (U-frame type) in the portion in which a slag bucket 30 is mounted. Provided at the two parallel legs of the U are each of the rear wheels of the slag transporter 10.

Pivoted to the ends of the U of the vehicle frame 14 is a first, likewise U-shaped tilt frame 20, this first tilt frame 20 being located in the vehicle frame 14 so that it is substantially located in the same plane as the vehicle frame 14 and the first tilt frame 20 being mounted within the U forming the vehicle frame 14. The U of the vehicle frame 14 in this arrangement is substantially parallel to the U of the first tilt frame 20 at all points, this meaning, more particularly, that both the vehicle frame 14 and the first tilt frame 20 are open at the rear end of the vehicle.

Likewise pivoted on the first tilt frame 20 is a second tilt frame 22 which is also configured U-shaped. The ends of the U forming the second tilt frame are pivotally hinged to the first tilt frame. In this arrangement a fulcrum of the second tilt frame 22 relative to the first tilt frame 20 is defined in a portion of the legs of the U of the first tilt frame in each case which corresponds to roughly a third of the leg length, starting from the free end of the legs of the first tilt frame 20. Provided at the second tilt frame 22 is a mount for the bucket trunnions 32 of a slag bucket 30. The mount 28 is located in a portion of the second tilt frame 22 provided in the vicinity of the fulcrum of the latter. Although, of course, two mounts are provided for the bucket trunnions, only one mount 28 is illustrated in each case in FIGS. 1, 3 and 4. The other mount is located symmetrical thereto on the second leg of the U forming the second tilt frame 22 to thus enable both bucket trunnions 32 of a slag bucket 30 to be clasped.

Provided at the mount 28 for the bucket trunnions 32 is a, preferably hydraulically actuatable, locking mechanism. The mount 28 for the bucket trunnions 32 is configured so that the bucket trunnions 32, and thus the slag bucket as a whole, can be urged from one side straight into the mount, the bucket trunnions then being clasped substantially on three sides by the mount. The locking mechanism on the mount 28 for the bucket trunnions 32 is provided movable on the free fourth side so that, when needed, it can be closed off and the bucket trunnion totally surrounded by the mount itself and the locking mechanism.

For moving the first and second tilt frames 20, 22 separate hydraulic cylinders 24, 26 are provided. The first hydraulic cylinder 24 pivoting the first tilt frame 20 is hinged at one end to the vehicle frame 14, the other end being provided on the first tilt frame 20 in the vicinity of the fulcrum of the second tilt frame 22 relative to the first tilt frame 20. The hydraulic cylinders are, of course, provided on both sides of the slag transporter, i.e. symmetrical to the hydraulic cylinder as described and evident in the Figures a second hydraulic cylinder is provided opposite the first hydraulic cylinder. To swivel the second tilt frame 22 relative to the first tilt frame 20 a hydraulic cylinder 26 is likewise secured to each of the two legs of the U of the second tilt frame 22. The second free ends of the hydraulic cylinder are attached to the first tilt frame 20 in a portion located in the vicinity of the transition between the legs and the connecting piece of the U.

In the embodiment as shown in FIGS. 1 to 4 a rocker 16 is applied to the vehicle frame 14, likewise symmetrical and duplicated, swivelled via a hydraulic cylinder 17. Secured to the rocker 16 are the rear wheels 18 of the slag transporter.

Figure 3:
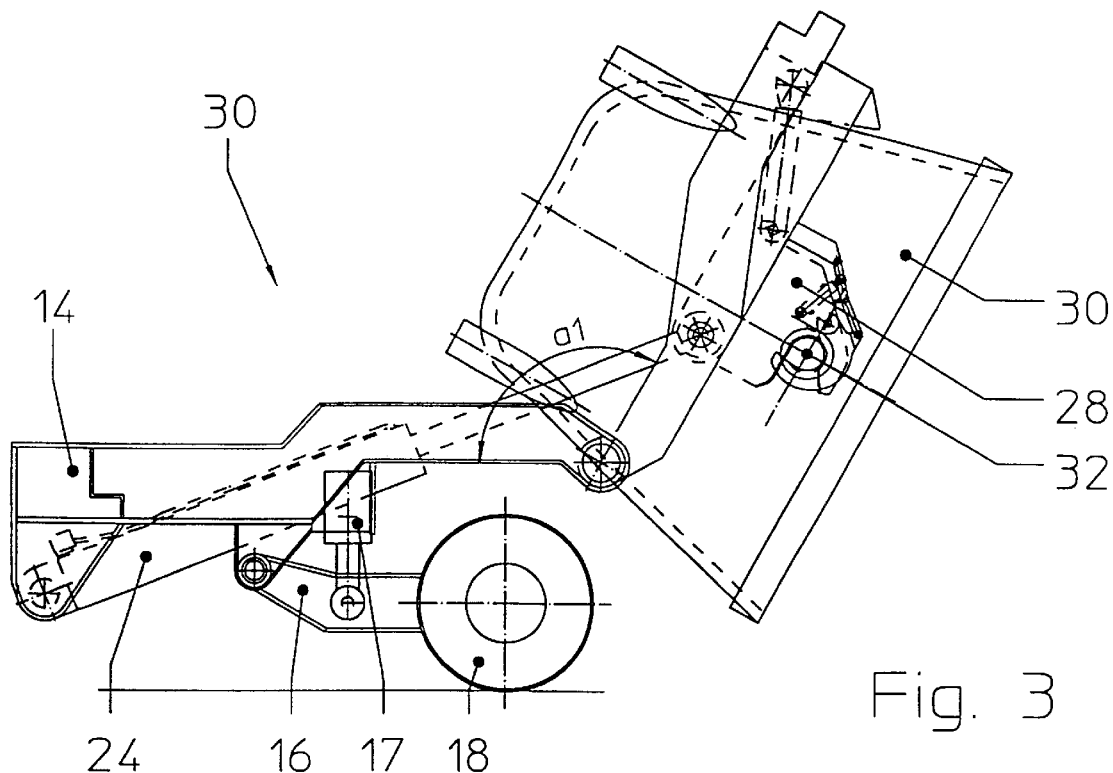
FIG. 3 is a side view of the rear portion of the slag transporter showing the slag bucket swivelled roughly 130° from the transport position.
Figure 4:
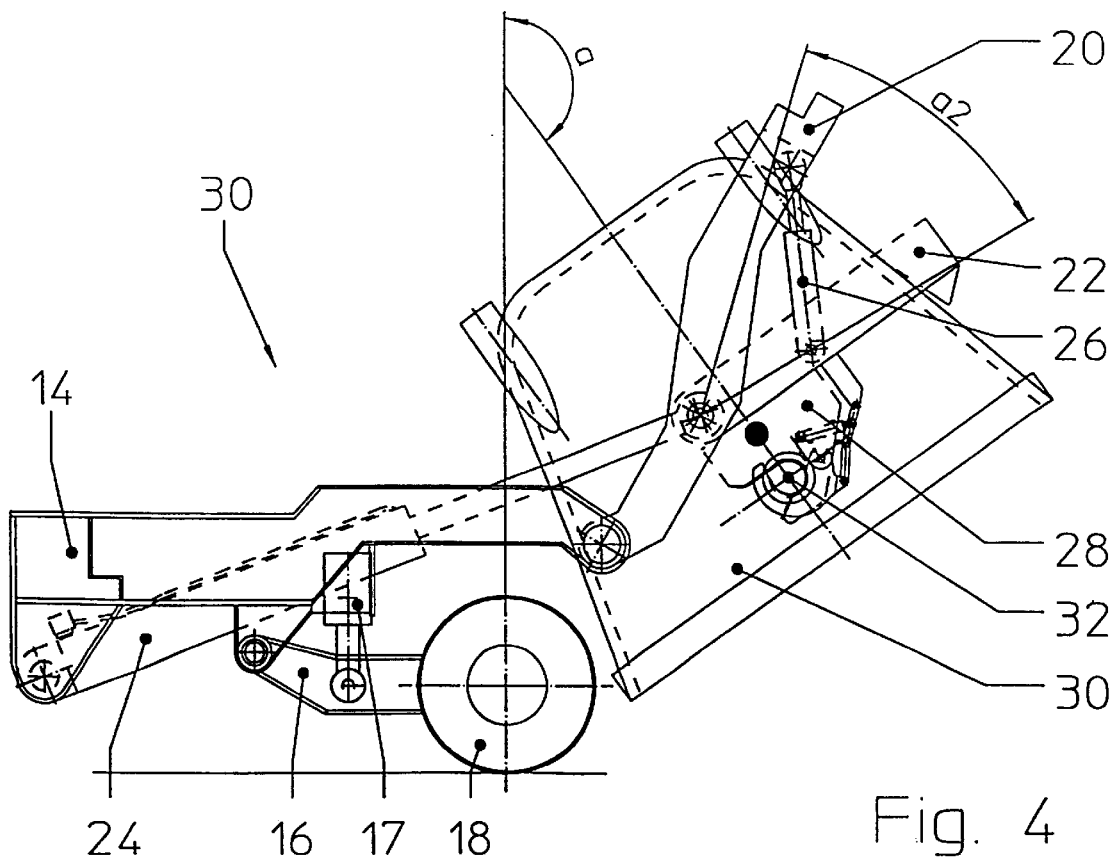
FIG. 4 is a side view of the rear portion of the slag transporter in accordance with the invention showing the slag bucket swivelled through roughly 150°.

Referring now to FIGS. 1, 3 and 4 the function of the booster of the slag transporter in accordance with the invention will now be detailed.

FIG. 1 shows the slag transporter transporting a slag bucket 30 in the transport position. In this arrangement the vehicle frame 14, the first tilt frame 20 and the second tilt frame 22 are all substantially parallel to each other. As evident from FIG. 1 the first tilt frame 20 is not visible in this position in the side view due to it being located within the U forming the vehicle frame 14, whereas the second title frame 22, except for the first tilt frame 20 as regards the vertical direction, is evident protruding beyond the vehicle frame 14 portionwise. In this arrangement the U-shapes of vehicle frame 14, first tilt frame 20 and second tilt frame 22 are each oriented the same so that, as clearly evident from FIG. 2, the rear end is open in the transport direction of the slag transporter and a slag bucket can be picked up and placed via this open end. In the transport position the locks for the bucket trunnions on the mount 28 for the bucket 32 are closed to lock the slag bucket 30 in place during transport. The rockers 16 mounting the rear wheels 18 of the slag transporter are substantially parallel to the vehicle frame in the transport position, resulting in the complete vehicle frame being substantially parallel to the ground. The hydraulic cylinders 24 and 26 serving to pivot the U-shaped tilt frames 20, 22 are not extended, i.e. they being fully retracted in this position, resulting in the tilt frames 20, 22 being in the position as shown parallel to the vehicle frame.

When a slag bucket 30 is to be emptied, as evident from FIGS. 3 and 4, for example, first the first hydraulic cylinder 24 is extended. This results in the first tilt frame 20 pivoting about the fulcrums located at the free ends of the U forming the vehicle frame 14. On full extension of the first hydraulic cylinder 24 swivelling of the first tilt frame 20 is possible through an angle $\alpha 1$, where $\alpha 1$ is max. 130°. As described in FIG. 1 the locks for the mount 28 for the bucket trunnions 32 are closed to ensure safe holding of the slag bucket 30 during tipping. The second tilt frame 22 is still located parallel to the first tilt frame 20, i.e. the second hydraulic cylinder 26 serving to swivel the second tilt frame 22 relative to the first tilt frame 20 is not extended, it instead being fully retracted. The total tilt angle $\alpha$ thus equals the swivel angle $\alpha 1$ of the first tilt frame 20. The rocker 16 for the rear wheels 18 is likewise parallel to the vehicle frame 14 now as then.

In this position usual emptying of the slag from the slag bucket 30 is possible, as is done also on prior art vehicles. When, however, hard-caked slag remainders need to be removed from the slag bucket 30, then the slag bucket needs to be tilted further, i.e. by a greater angle.

Referring now to FIG. 4 there is illustrated how this is done by extending the second hydraulic cylinder 26 to pivot the second tilt frame 22 relative to the first tilt frame 20 about an angle $\alpha 2$, whereby the angle $\alpha 2$ may be totally approx. 50° to thus make it possible to pivot the slag bucket "upside down". In this position the slag, for one thing, is better able to flow off, and for another, by bumping the slag bucket 30 on the ground hard-caked slag can also be released. As evident from FIG. 4 the fulcrum of the second tilt frame 22 relative to the first tilt frame 20 is located in a portion which is remote by roughly a third of the leg length from the fulcrum of the first tilt frame 20 relative to the vehicle frame 14. It is evident that the fastening point of the first hydraulic cylinder 24 of the first tilt frame 20 substantially coincides with the fulcrum of the second tilt frame 22 relative to the first tilt frame 20. The angles $\alpha 1$ and $\alpha 2$ add up on swivelling in thus making a total tilt angle a of up to 180° possible ($\alpha = \alpha 1 + \alpha 2$). As evident, the locking mechanisms on the mounts for the bucket trunnions remain closed during the complete swivelling action so that it is impossible for the slag bucket to slip out of place, which due to the hot slag and heavy weight concerned would otherwise pose serious risks. It is furthermore evident from FIG. 4 how the rocker 16 carrying the rear wheels 18 remains substantially parallel to the vehicle frame 14.

Lifting and lowering the rocker 16 is particularly of advantage when a slag bucket needs to be picked up from an elevated location.

The salient aspect of the slag transporter in accordance with the invention is that tilting the slag bucket up to as much as 180° is now possible in a U-frame type slag transporter, resulting in slag remainders being released from the slag bucket or not hard-caking since emptying is now instant. The arrangement of the two U-shaped tilt frames which is configured such that the first tilt frame is mounted in the vehicle frame and the second tilt frame is mounted on the first avoids any widening of the vehicle as compared to conventional U-frame type slag transporters whilst nevertheless assuring stable vehicle operation.

What is claimed is:

1. A slag transporter comprising:
    a drive unit;
    a U-frame type vehicle connected to the drive unit;
    two rear wheels secured to the rear frame; and
    a tilting means hinged to the vehicle frame for tilting a slag bucket,
    wherein said tilting means for said slag bucket comprises a first tilt frame hinged to said vehicle frame and which is swivable relative to said vehicle frame by a first swivelling means, and a second tilt frame hinged to said first tilt frame and which is swivable relative to said first tilt frame by a second swivelling means, a mount being provided on said second tilt frame for the bucket trunnions of said slag bucket, wherein a fastening point between said first swivelling means and said first tilt frame substantially coincides with a fulcrum of said second tilt frame relative to said first tilt frame.

2. The slag transporter as set forth in claim 1, wherein each of said first and second swivelling means is a hydraulic cylinder.

3. The slag transporter as set forth in claim 1, wherein said mount for said bucket trunnions of said slag bucket comprises a locking means.

4. The slag transporter as set forth in claim 1, wherein said first tilt frame is essentially U-shaped, said first tilt frame being dimensioned so that it is accommodated substantially within said vehicle frame.

5. The slag transporter as set forth in claim 1, wherein said first tilt frame is positioned above said vehicle frame.

6. The slag transporter as set forth in claim 1, wherein said second tilt frame is essentially U-shaped.

7. The slag transporter as set forth in claim 6, wherein said second tilt frame is dimensioned so that it is accommodated within said first tilt frame.

8. The slag transporter as set forth in claim 1, wherein said second tilt frame is positioned above said first tilt frame.

9. The slag transporter as set forth in claim 1, wherein said first swivelling means is secured to said vehicle frame and the hinging point between said first and said second tilt frame in each case and said second swivelling means is secured to said second tilt frame and a portion in the vicinity of the end of said first tilt frame remote from said hinging point between vehicle frame and first tilt frame in each case.

10. The slag transporter as set forth in claim 1 including two rockers secured to said vehicle frame for said rear wheels, an axle cylinder for lifting and lowering said vehicle frame being arranged on each rocker.

11. The slag transporter as set forth in claim 1, wherein in a first closed position, said vehicle frame, said first tilt frame, and said second tilt frame are disposed substantially parallel to each other.

12. The slag transporter as set forth in claim 11, wherein in said first closed position, said first tilt frame lies in the same plane as said vehicle frame along lengths thereof such that said first tilt frame is free from extending below said vehicle frame.

13. The slag transporter as set forth in claim 11, wherein in said first closed position, the entire second tilt means lies in a plane which is at least one being coincident with and above a plane containing said vehicle frame.

14. A slag transporter comprising:

a drive unit;

a U-shaped vehicle frame connected to said drive unit;

two rear wheels secured to said vehicle frame;

a tilt mechanism hingedly coupled to vehicle frame for titling a slag bucket, said tilt mechanism including a first tilt frame hingedly coupled to said vehicle frame by a first actuatable swiveling device and a second title frame hindgedly coupled to said first tilt frame and which is swivable relative to said first tilt frame by a second actuatable swiveling device, said first actuatable swiveling device being coupled at a first end to said first tilt frame at a first location, said second tilt frame being hingedly coupled to said first tilt frame at said first location; and a mount being provided on said second tilt frame for bucket trunnions of said slag bucket, wherein in a first closed position, said vehicle frame and said first and second tilt frames are substantially parallel to each other.

15. The slag transporter as set forth in claim 14, further including:

an actuatable lock mechanism for locking said slag bucket by clasping said trunnions, said lock mechanism being provided at said mount, said trunnions being clasped at a second location which is offset from said first location where said second tilt frame is hingedly coupled to said first tilt frame.

16. The slag transporter as set forth in claim 15, wherein said mount is disposed above said second tilt frame.

17. The slag transporter as set forth in claim 14, further including:

locking means for locking said slag bucket by clasping said trunnions, said locking means being provided at said mount, said trunnions being locked by said locking means at a second location which is different and offset from said first location where said second tilt frame is hingedly coupled to said first tilt frame, whereby said slag bucket is located at said second location which lies outside of a plane containing the second tilt frame.

* * * * *